United States Patent [19]
Wolfe

[11] 3,752,050
[45] Aug. 14, 1973

[54] STILL CAMERA WITH A FILM TRANSPORT SYSTEM
[76] Inventor: Maynard Frank Wolfe, P.O. Box 20339, Sai Ying Pun, Hong Kong
[22] Filed: June 6, 1972
[21] Appl. No.: 260,182

[30] Foreign Application Priority Data
June 7, 1971 Great Britain.................. 19,305/71

[52] U.S. Cl............................. 95/31 FL, 95/31 AC
[51] Int. Cl. .......................................... G03b 1/61
[58] Field of Search .................... 95/31 FM, 31 FL, 95/31 AC

[56] References Cited
UNITED STATES PATENTS
2,621,866  12/1952  Harvey............................ 95/31 FL
2,591,417  4/1952   Frye................................. 95/31 FM
1,997,333  4/1935   Hultquist et al. ................ 95/31 FM
2,838,984  6/1958   Lareau et al...................... 95/31 FL
2,351,999  6/1944   Nerwin............................. 95/31 FL FOREIGN PATENTS OR APPLICATIONS
59,245   3/1947   Netherlands...................... 95/31 FL
22,104   10/1904  Great Britain.................... 95/31 FM Primary Examiner—Robert P. Greiner
Attorney—Irving Seidman et al.

[57] ABSTRACT

A still camera with a film transport system equipped with a film winding lock that is releaseable independently of the shutter mechanism to present the film for exposure one frame at a time in counted succession.

7 Claims, 2 Drawing Figures

Patented Aug. 14, 1973

3,752,050

STILL CAMERA WITH A FILM TRANSPORT SYSTEM

BACKGROUND AND SUMMARY OF THE INVENTION

This invention relates in general to cameras and more particularly to a still camera that is adapted to use perforated roll film.

While there are a variety of cameras known in the prior art that use various standard sizes of perforated roll film, many of these cameras are quite expensive because they provide complex precision mechanisms for controlling the film winding and for locking and unlocking the film so as to expose it one frame at a time in succession. Many prior art cameras provide film winding locks that are connected to the shutter mechanism so that when the shutter is uncocked the film can be wound off the supply roll until a full frame is presented for exposure, and then the film winding means is locked until released by actuation of the shutter as when an exposure is made. In many cases, cocking of the shutter is effected by the film winding means.

According to the instant invention, the expense and complexity of prior art roll film cameras is avoided through the use, in a still camera, of a film transport system equipped with a film winding lock that operates and is releaseable independently of the shutter mechanism to present the film for exposure one frame at a time in counted succession.

This invention provides in a still camera a housing with means therein for storing and for winding a roll of perforated film, rotary means cooperating with said perforations and drivingly connected to a locking element, and a locking member biased into engagement with the locking element and limitedly displaceable on engagement by an abutment surface of the locking element to index a counting element.

Preferably, the rotary means cooperating with the film perforation is a pair of spaced sprockets on a shaft having an axial extension to which is fixedly secured a disc cam constituting said locking element and having a radial abutment surface.

The locking member may conveniently be an axially displaceable and pivotal lever carrying a finger biased into engagement with teeth on the periphery of a counting wheel whereby axial displacement of the lever by the action of the locking element causes said finger to index the counting wheel.

For a better understanding of the invention and its several advantages, reference should be had to the accompanying drawing and the following detailed description which exemplify a preferred embodiment of the invention.

DESCRIPTION OF A PREFERRED EMBODIMENT OF THE INVENTION

Figure 2:
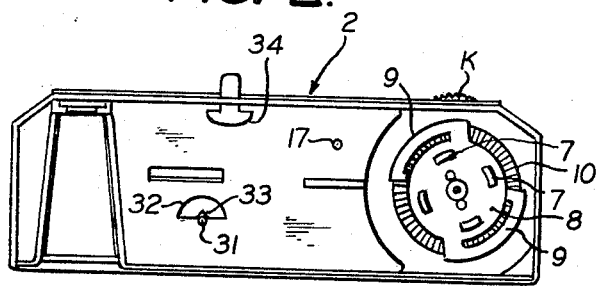
FIG. 2 is a bottom view of the top cover and its associated parts, used by the camera of FIG. 1 as seen removed from the camera and rotated 90 degrees from its normal attitude when installed upon the camera.
Figure 1:
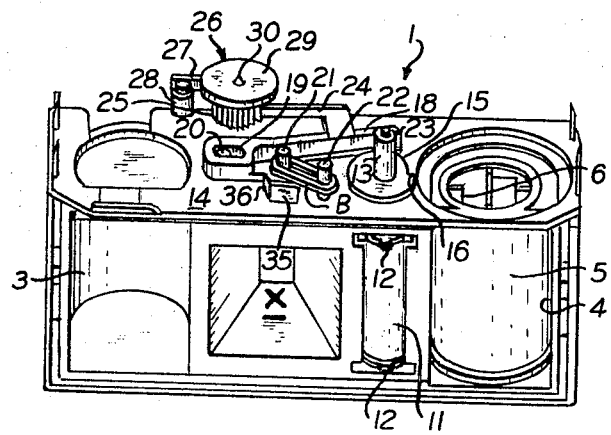
FIG. 1 is a perspective view of a still camera constructed according to a preferred embodiment of the invention as seen with the back cover removed to show how the film supply and take-up facilities are arranged, and with the top cover removed to expose the working parts of the film transport system.

In FIGS. 1 and 2 there is exemplified a camera having a conventional lens and shutter means provided in a housing which is divided into a main body 1, a top cover 2, and a back cover (not shown) which fits upon body 1 to form a light-proof enclosure for the film (not shown). The body 1 is provided with a compartment 3 for accommodating a spool of film (not shown) with perforated lateral edges and a compartment 4 which accommodates a hollow cylindrical take-up spool 5 which is provided in its upper end portion with four equiangularly spaced ribs 6 engageable by lugs 7 depending from a winding disc 8 mounted coaxially with a winding knob which an operator manipulates to wind the film into the take-up spool 5. The winding disc 8 is provided at diametrically opposed locations thereon with resilient pawls 9 which engage the teeth of a fixed circular rack 10 to prevent reverse rotation of the winding knob K.

In the body 1 adjacent the compartment 4 for the take-up spool 5 is rotatably mounted a shaft 11 carrying spaced apart sprockets 12 which engage the perforations in the lateral edges of the film. The shaft 11 has an axial extension 13 which projects through a top plate 14 of the body 1 and fixedly secured thereon a locking element in the form of a disc cam 15 having a radial abutment surface 16. The tip of the shaft extension 13 is engaged in a bearing recess 17 on the inside surface of the cover 2 when the camera is in the assembled condition.

The top plate 14 of the body 1 carries a locking member in the form of a lever 18 having at one end thereof an axial slot 19 receiving a pivot pin 20 secured to the top plate 14. An elastic rubber band B or spring extends between a peg 21, formed on the lever 18 intermediate its ends, and a post 22 secured to the top plate 14. The opposite end of the lever 18 is provided with a head 23 engageable by the radial abutment surface 16 of the disc cam 15.

The lever 18 carries thereabove a resilient finger 24 which extends substantially axially thereof. The free end of the finger 24 is biased by its resilience into engagement with a cylindrical rack 25 on the periphery of a counter wheel 26 rotatably mounted in the top plate 14. The cylindrical rack 25 is also engaged by a further resilient finger 27 carried by a post 28 on the top plate 14. The finger 27 serves to exercise a restraint on rotation of the counter wheel 26 in the forward direction as well as assisting the finger 24 on the lever 18 in resisting reverse rotation of the counter wheel 26.

The top face 29 of the counter wheel 26 has a central bearing depression 30 which engages a projection 31 on the inside surface of the cover 2 in the assembled camera. The edge of the top face 29 bears a plurality of markings (not shown) corresponding to the number of teeth on the rack 25. These markings are preferably numerals and indicate the number of exposed or unexposed frames of the film. Part of the top face 29 of the counter wheel 26 is visible in the assembled camera through a semi-circular window 32 the edge of which incorporates a pointer 33.

A pusher 34 is displaceable through a side wall of the cover 2 into engagement with an upstanding flage 35 on the end of an arm 36 of the lever 18.

When it is desired to wind the film onto the next frame, the winding knob K is rotated to cause the take-up spool 5 to be entrained by the winding disc 8 due to cooperation of the lugs 7 depending from the disc 8 with the ribs 6 inside the upper end of the take-up spool 5. Since the lateral perforations in the film are engaged by the sprockets 12, travel of the film onto the take-up spool 5 causes rotation of the sprockets 12 and hence of the sprocket shaft 11, axial extension 13 of the shaft 11, and the disc cam 15. The cam 15 rotates until its radial abutment surface 16 engages the head 23 of the lever 18 and causes the lever 18 to be axially displaced to a limited extent permitted by the slot 19 therein. During displacement the free end of the resilient finger 24 urges against a tooth of the cylindrical rack 25 on the periphery of the counter wheel 26 causing the wheel 26 to rotate through a distance corresponding to one tooth on the rack 25 which brings the next successive marking on the top face 29 of the wheel 26 into line with the pointer 33 of the window 32. Further transport of the film is now prevented by engagement of the abutment surface 16 of the cam 15 with the head 23 of the lever 18. As soon as the operator ceases to exert a winding force on the winding knob 9 the lever 18 reverts to its original position under the action of the elastic band B. When it is then desired to advance the film another frame, the pusher 34 is depressed to act against the flange 35 on the end of the arm 36 of the lever 18, thus pivoting the lever 18 into a position in which the cam 15 is again free to rotate. As soon as the abutment surface 16 of the cam 15 has been moved out of the locking position the pusher 34 can be released.

The embodiment of the invention described above provides a still camera with means for metering and for locking the film which are of simplified construction and of reduced cost. Such metering and locking means are particularly applicable to a "disposable" type camera, i.e., a camera which is pre-loaded and intended to be thrown away after the one roll of pre-loaded film has been used. If there is a desire to reload or re-use the camera, then the counter wheel 26 can be rotated manually to the start position as indicated on the top face 29 of the counter wheel 26. Further cost reduction can be obtained by making the housing body and cover as integral mouldings by synthetic plastics material and also fabricating the movable components in synthetic plastics material.

From the foregoing description, it will be appreciated by the artisan that the invention can be regarded as the combination, in a camera, of three basic means, namely a film transport means, a locking means, and a release means. The film transport means, which includes the elements 6, 7, 8, 9, 10, K, 11, 12 used for winding, is operable to advance perforated film along a path extending from a fresh film storage zone, i.e., compartment 3, to an exposed film storage zone, i.e. compartment 4, and present the fresh film one frame at a time in succession at an exposure zone X located between the two storage zones 3 and 4. The locking means includes the elements 15, 16, 18, 23 and others which function together to establish a coupling to the film transport means and respond to the film advancement thereby so as to lock the transport means, specifically elements 11 and 12 thereof, against further film advancement when a full frame length of fresh film is presented at the exposure zone. Release means 34 is disposed for cooperation with element 35 of the locking means and is operable from outside the camera to release the locking action upon the film transport and thereby allow advancement of the next frame of film to the exposure zone X.

While a specific embodiment of the invention has been shown and described in detail to illustrate the application of the principles of the invention, it will be readily understood and appreciated that various changes or modifications thereof may be made without departing from the spirit or scope of the invention.

I claim:

1. A camera comprising a housing with means therein for storing and for winding a roll of perforated film, rotary means cooperating with said perforations and drivingly connected to a first locking element, a second locking element biased into engagement with the first locking element and limitedly displaceable on engagement therewith by an abutment surface of the first locking element to index a counting element, said rotary means having teeth that engage the perforations of the film for turning the rotary means by the linear movement of the film during winding thereof, said second locking element cooperating with said first locking element to lock the rotary means against turning upon the winding of a given length of film, thereby preventing further winding of the film, and release means selectively operable to release the locking action of said first and second locking elements to allow further winding of the film.

2. A camera according to claim 1, wherein the rotary means cooperating with the film perforation is a pair of spaced sprockets on a shaft having an axial extension to which is fixedly secured a disc cam constituting said first locking element and having a radial abutment surface.

3. A camera according to claim 1, wherein the second locking element is an axially displaceable and pivotable lever carrying a finger biased into engagement with teeth on the periphery of a counting wheel whereby axial displacement of the lever by the action of the first locking element causes said finger to index the counting wheel.

4. A camera according to claim 1, wherein the displacement of the second locking element is limited by a projection on the housing, which projection extends into an elongated slot formed in the second locking element.

5. A camera according to claim 1, wherein the housing consists of integrally moulded synthetic plastics material.

6. In a camera, the combination comprising a film transport means operable to advance perforated film along a path extending from a fresh film storage zone to an exposed film storage zone and present the film one frame at a time in succession at an exposure zone located between said storage zones, locking means coupled to said film transport means for response to the film advancement thereby and operable to lock said film transport means against further film advancement when a full frame length of fresh film is presented at the exposure zone, and release means disposed for cooperation with said locking means and independently operable from outside the camera to release the locking action of said locking means upon the film transport means to allow the advancement thereby of fresh film constituting the next frame of film presented at the exposure zone, said locking means including a rotor having teeth that engage the perforations of the film for turning the rotor by and in accordance with the advancement of the film, and locking elements that cooperate to lock the rotor against further turning when a full frame length of film is presented at the exposure zone.

7. The combination according to claim 6 including a counter coupled to said locking means for indexing thereby to count the number of frames of film presented at the exposure zone.

* * * * *